No. 11,829. Reissued June 5, 1900.
J. W. POINDEXTER.
TUBE FOR GRAIN DRILLS.
(Application filed May 2, 1900.)
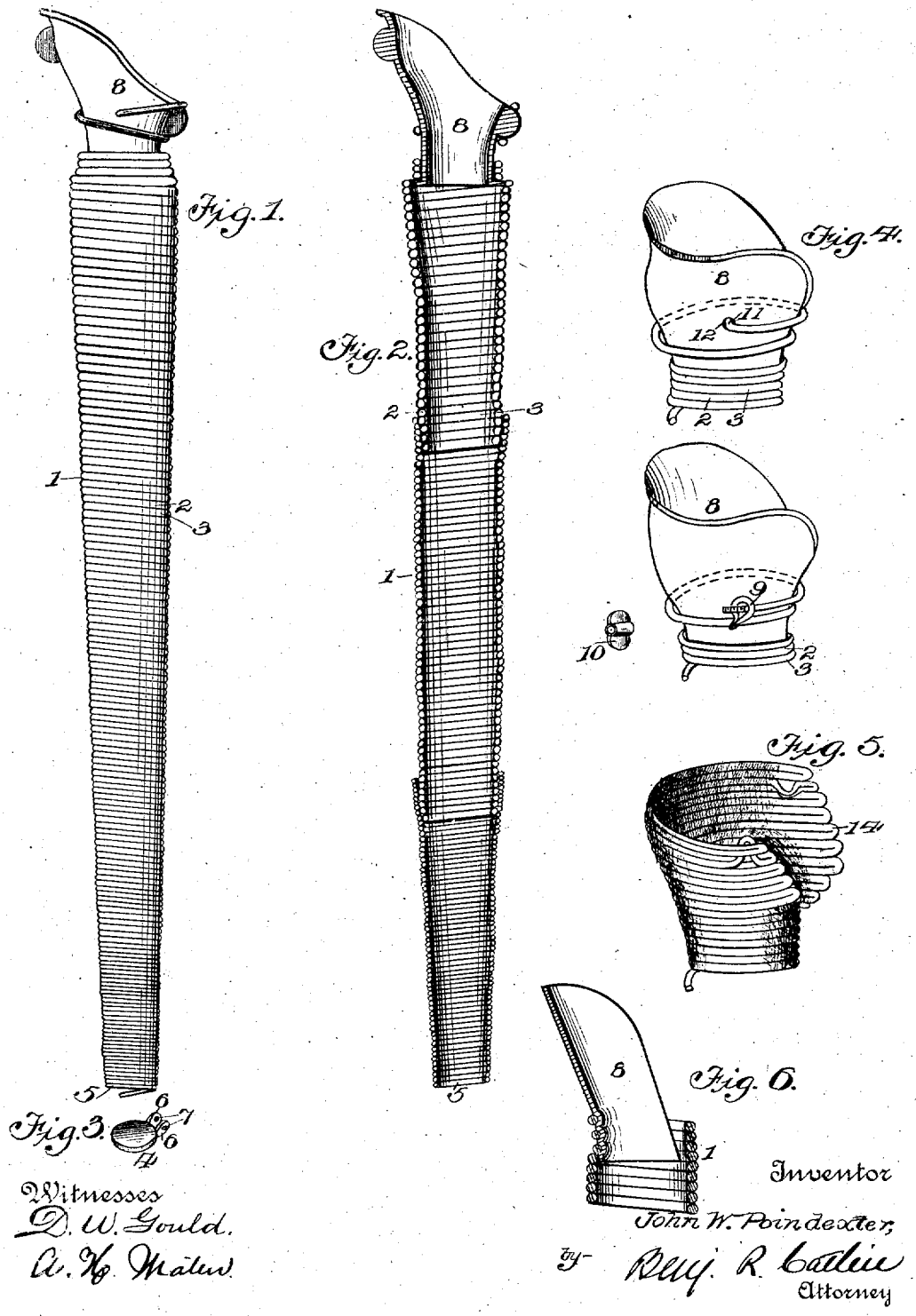
THE MORRIS PETERS CO., WASHINGTON, D. C.

UNITED STATES PATENT OFFICE.

JOHN W. POINDEXTER, OF CYNTHIANA, KENTUCKY.

TUBE FOR GRAIN-DRILLS.

SPECIFICATION forming part of Reissued Letters Patent No. 11,829, dated June 5, 1900.

Original No. 646,872, dated April 3, 1900. Application for reissue filed May 2, 1900. Serial No. 15,290.

*To all whom it may concern:*

Be it known that I, JOHN W. POINDEXTER, a citizen of the United States, residing at Cynthiana, in the county of Harrison and State of Kentucky, have invented new and useful Improvements in Tubes for Grain-Drills, of which the following is a specification.

My invention relates to grain-drill tubes; and the objects of the same are to provide a tube which will be practically indestructible, which will be flexible, but will not choke up or buckle, which can be applied to grain-drills in present use, and which can be produced at a small cost. I attain these objects and advantages by means of the construction shown in the accompanying drawings, which form a part of this specification, and in which—

Figure 1 is a side elevation of one form of my improved tube attached to a grain-cup. Fig. 2 is a longitudinal section of a modification thereof. Fig. 3 is a detail perspective of a valve or flap which I may attach to the discharge end of the tube to prevent clogging of said tube. Fig. 4 is a detail view showing different means for attachment of the tube to cups of different shapes. Fig. 5 is a detail perspective of a combined tube and cup made in accordance with my invention. Fig. 6 is a similar view of a modified form thereof.

Like numerals of reference designate like parts in the different views.

Referring to Fig. 1 of the drawings, it will be seen that the tube is made of a single length of resilient wire wound upon a mandrel, so that the adjacent convolutions or coils are in contact from end to end of the tube. The wire from which the tube is made is of gradually-reduced size in cross-section from the upper to the lower end—that is to say, the wire is tapering in size. The advantage gained by such a structure is that where a greater degree of flexibility is desirable (the discharge end) the wire from which this portion of the tube is formed is of a smaller gage than the upper end, which fits the cup, and the upper end is of necessity sufficiently large to make a firm connection with said cup. Instead of making the tube of a single length of tapering wire some of the advantages of this feature may be attained by the use of more than one gage of wire in the tube, as shown in Fig. 2. At the upper end, where strength and rigidity are desirable, wire of larger size may be used, and at the lower end a smaller and more flexible wire is used, and the sections are connected by screwing one into the other. If three pieces are used, the intermediate piece may be of an intermediate gage, and all the pieces are connected together to form a practically-continuous tube. The tube is tapering from end to end, and the numeral 1 designates the tube, and 2 and 3 two contiguous coils thereof.

A valve 4, consisting of a disk of substantially the required size to fit the discharge-opening 5 of the tube, is provided with two ears or lugs 6, and the lower coil of the tube is passed through perforations 7 in the lugs 6 to hinge the valve in place.

As shown in Fig. 4, different means may be employed for holding the upper end of the tube to the cup 8. The end of the wire may be formed into a ring or loop 9, and a thumb-nut 10 may be adjusted upon the end of the wire to fasten the tube firmly to the cup, or the end of the wire may be bent inwardly, as at 11, to form a projection which will spring into a perforation 12 in the cup. The upper end of the tube may be made flaring and of such size that two or more coils may be cut off to make the tube fit a small cup, or any number of coils may be cut off to fit different sizes of cups. The taper of the flared end in the present instance exceeds that of the main part of the tube, and in any case it should be sufficient for the purpose above pointed out. The comparative smallness of the upper coils, as represented, is a result of contracting them upon the cup in securing them to it after the devices have been assembled, said coils being, in fact, the largest before they are so contracted.

As shown in Fig. 5, a combined tube and cup may be formed either of a single piece of wire or of several pieces of different gage, as previously described. In forming the cup portion the wire is looped back and forth, as at 14, to form the upper portion of the cup, and the lower portion is then wound spirally, as hereinbefore described.

As shown in Fig. 6, the cup 8′ is approximately semicylindrical in form and has in its lower end grooves to receive the upper coils of the tube and be thereby held by their resiliency.

From the foregoing it will be obvious that my tube is strong and durable, will not buckle in use, and can be produced at a small cost.

The valve in the discharge end of the tube is set with its hinge toward the front end of the tube, so that dirt cannot enter the opening to clog it. If there is a pressure upon the valve, it closes, but immediately opens when the pressure is removed.

Having thus fully described my invention, what I claim is—

1. A combined grain-drill tube and cup made of wire coiled spirally to form the tube, and the cup being formed by loops in the wire, the wire strands lying in contact, substantially as described.

2. A grain-drill tube formed of wire coiled spirally and the adjacent coils lying in contact with each other, the discharge end of the tube being of greater flexibility than the upper end, substantially as described.

3. A grain-drill tube formed of spirally-coiled wire, a flap-valve secured to the discharge end of said tube, said valve consisting of a disk hinged to the outer coil of the tube, substantially as described.

4. A combined grain-drill tube and cup formed of wire coiled spirally to form the tube and the cup being formed by loops in wire o larger gage than the wire from which the tube is formed, substantially as described.

5. A grain-drill tube made of wire coiled spirally and having the adjacent coils in contact with each other, the receiving end of the tube being flared, as and for the purpose set forth.

6. The combined grain-drill tube and cup comprising the coiled wire tube and the semi-cylindrical cup held by the resilient upper coils of the tube, substantially as described.

In testimony whereof I have hereunto set my hand in presence of two subscribing witnesses.

JOHN W. POINDEXTER.

Witnesses:
CHESTER M. JEWETT,
ELBERT M. SMITH.